United States Patent
Wang et al.

(10) Patent No.: US 12,516,142 B2
(45) Date of Patent: Jan. 6, 2026

(54) PROCESS FOR RECYCLING PROPYLENE-ETHYLENE COPOLYMERS

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Johanna Lilja, Porvoo (FI); Anita Luyten, Beringen (BE)

(73) Assignee: Borealis AG, Vienna (AT)

( * ) Notice: Subject to any disclaimer, the term of this patent is extended or adjusted under 35 U.S.C. 154(b) by 354 days.

(21) Appl. No.: 18/247,342

(22) PCT Filed: Sep. 27, 2021

(86) PCT No.: PCT/EP2021/076522
§ 371 (c)(1),
(2) Date: Mar. 30, 2023

(87) PCT Pub. No.: WO2022/069414
PCT Pub. Date: Apr. 7, 2022

(65) Prior Publication Data
US 2024/0002559 A1    Jan. 4, 2024

(30) Foreign Application Priority Data

Sep. 30, 2020    (EP) .................................. 20199432

(51) Int. Cl.
*C08F 210/06*    (2006.01)
*B29B 17/00*    (2006.01)
(Continued)

(52) U.S. Cl.
CPC ............ *C08F 210/06* (2013.01); *B29B 17/00* (2013.01); *B29C 45/0001* (2013.01);
(Continued)

(58) Field of Classification Search
CPC ......... C08F 210/06; C08F 210/16; C08F 2/00
See application file for complete search history.

(56) References Cited

U.S. PATENT DOCUMENTS

| 3,887,534 A | 6/1975 | Baba et al. |
| 4,282,076 A | 8/1981 | Boynton |
| 2020/0165425 A1* | 5/2020 | Gahleitner ............ C08F 210/16 |

FOREIGN PATENT DOCUMENTS

| EP | 3617238 A1 | 3/2020 |
| WO | 2016116606 A1 | 7/2016 |

(Continued)

OTHER PUBLICATIONS

International Application No. PCT/EP2021/076522, "International Search Report", mailed Feb. 24, 2022, 2 pages.

*Primary Examiner* — Frank J Vineis
(74) *Attorney, Agent, or Firm* — COZEN O'CONNOR

(57) ABSTRACT

Disclosed herein is a process for recycling propylene-ethylene copolymers to obtain polymers having good optical and mechanical properties, and good processability. The process comprises polymerizing propylene and ethylene under dynamic conditions; collecting the resulting copolymer powders as a mixture having an $MFR_2$ ranging from 1.5 to 80.0 g/10 min and an ethylene content from 1.0 to 4.0 wt. %; compounding the mixture in the presence of a radical initiator and a clarifying agent; and extruding the mixture into pellets. The pellets have an $MFR_2$ ranging from 20 to 120 g/10 min; a ratio of $MFR_{2\ pellets}/MFR_{2\ powder}>1$; an ethylene content ranging from 1.0 to 4.0 wt %; a crystallization temperature ranging from 100 to 125° C.; and a flexural modulus of 850 MPa or more. The disclosure also relates to the propylene-ethylene copolymer pellets thus obtained; articles made from the pellets; and the use of the pellets in injection molding applications.

7 Claims, 5 Drawing Sheets

(51) Int. Cl.
  *B29C 45/00*    (2006.01)
  *B29C 48/00*    (2019.01)
  *B29C 48/04*    (2019.01)
  *B29C 48/36*    (2019.01)
  *B29C 48/92*    (2019.01)
  *B29D 22/00*    (2006.01)
  *B29K 23/00*    (2006.01)
  *B29K 105/00*   (2006.01)
  *B29K 105/26*   (2006.01)
  *B29L 31/00*    (2006.01)

(52) U.S. Cl.
  CPC ............ *B29C 48/022* (2019.02); *B29C 48/04* (2019.02); *B29C 48/36* (2019.02); *B29C 48/92* (2019.02); *B29D 22/003* (2013.01); B29C 2045/0091 (2013.01); B29C 2945/76531 (2013.01); B29C 2945/76545 (2013.01); B29C 2945/76585 (2013.01); B29C 2948/92209 (2019.02); B29C 2948/92266 (2019.02); B29K 2023/16 (2013.01); B29K 2105/0008 (2013.01); B29K 2105/0014 (2013.01); B29K 2105/0032 (2013.01); B29K 2105/26 (2013.01); B29K 2995/0012 (2013.01); B29K 2995/0082 (2013.01); B29L 2031/7132 (2013.01)

(56)            References Cited

FOREIGN PATENT DOCUMENTS

WO   WO-2019042875 A1 *  3/2019  ............. C08F 2/001
WO       2019197384 A1    10/2019

* cited by examiner

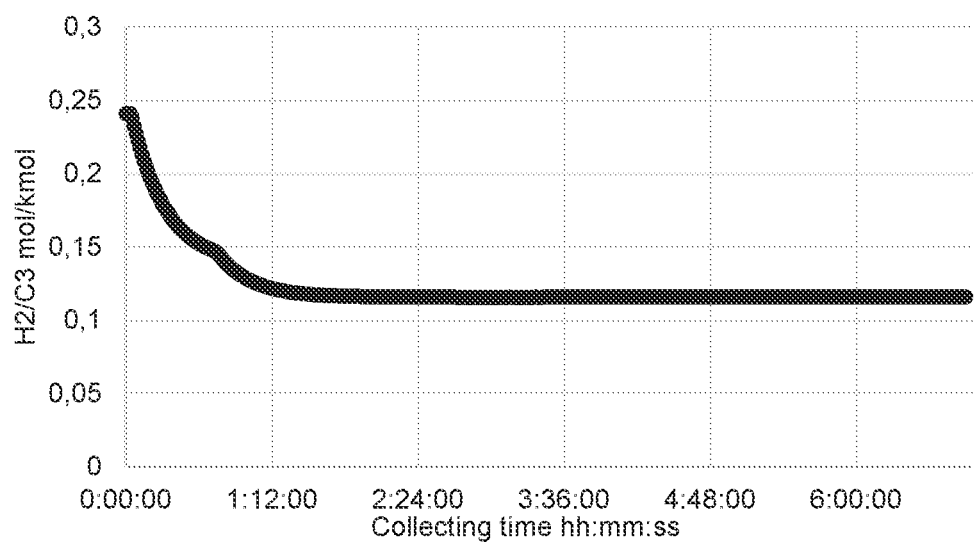
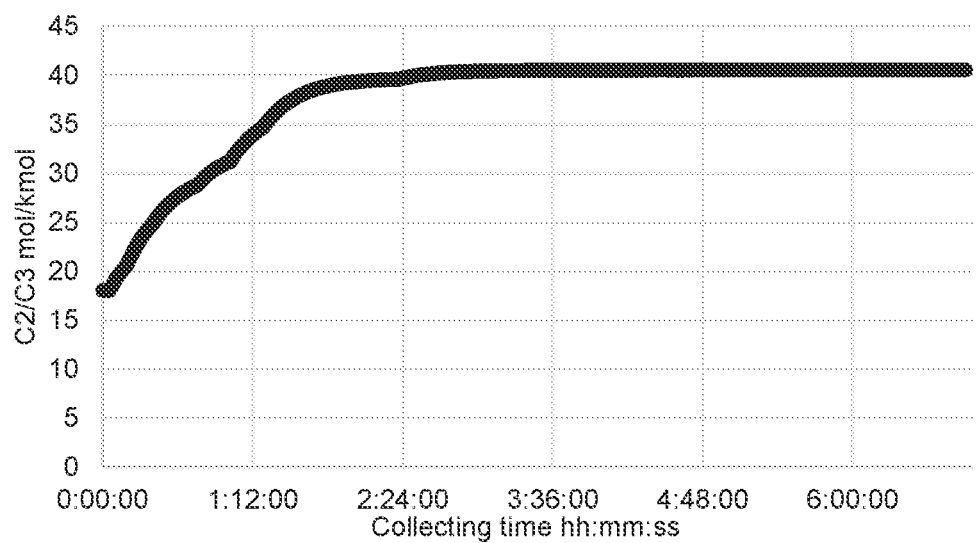

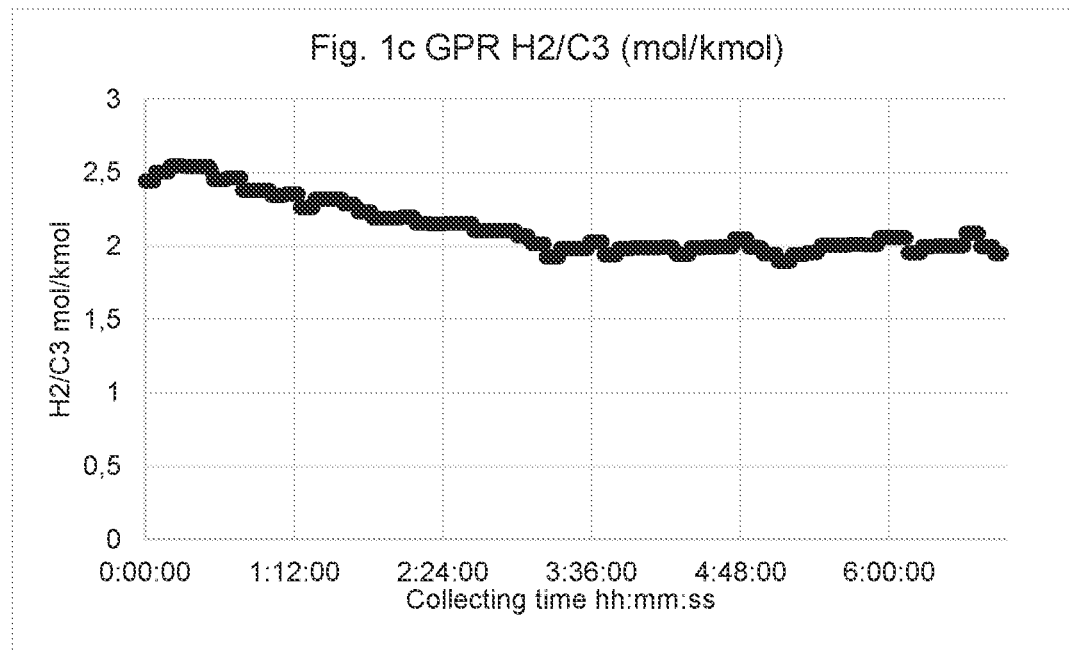
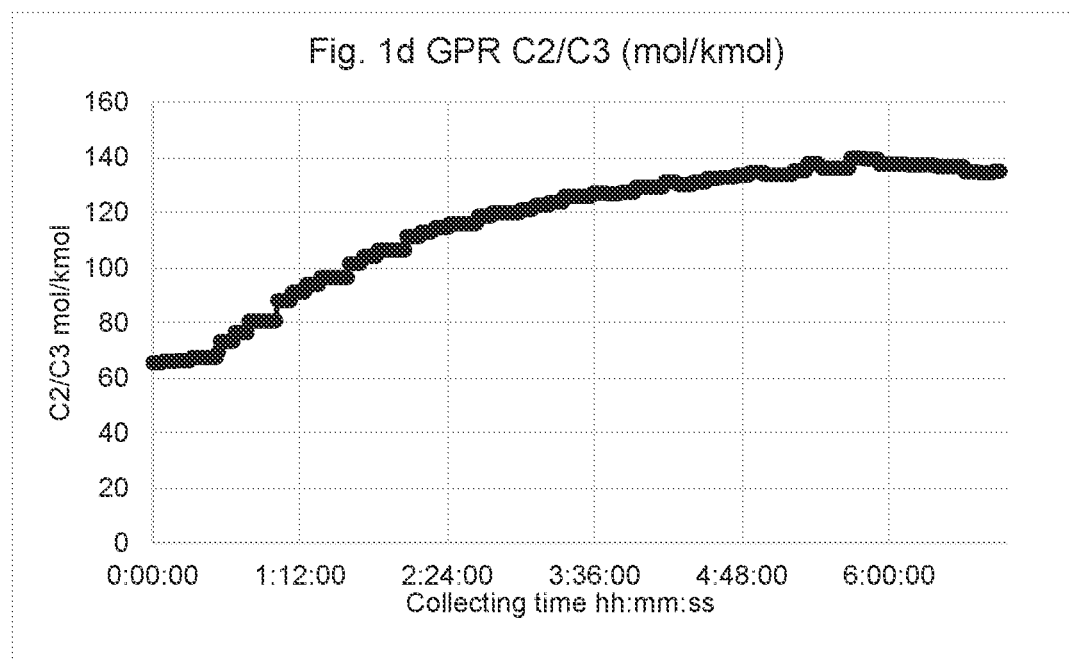

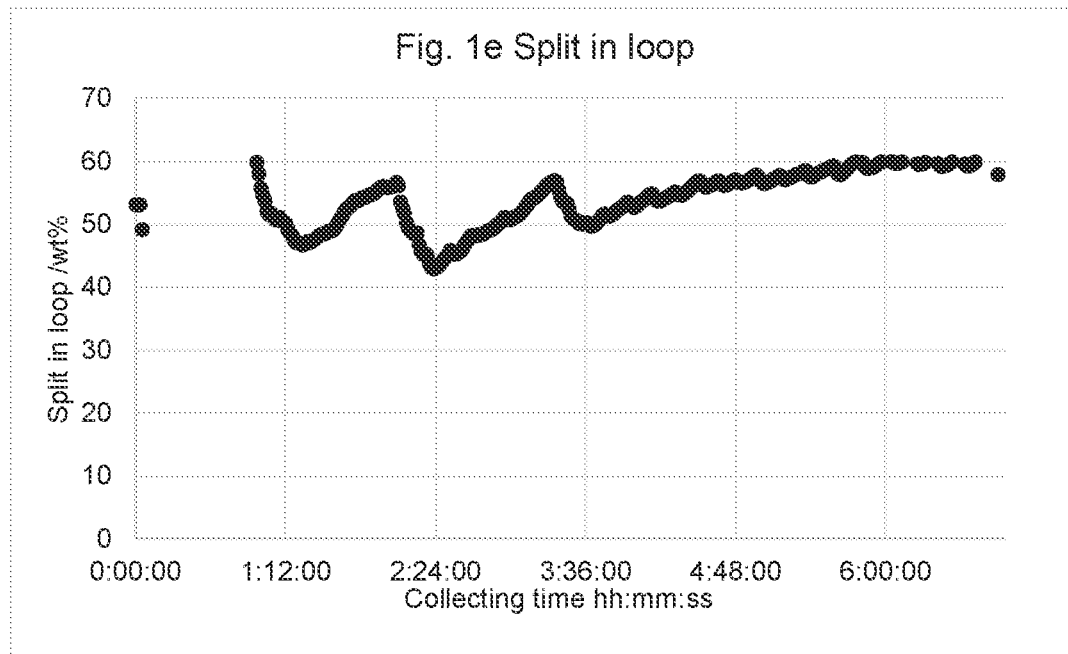

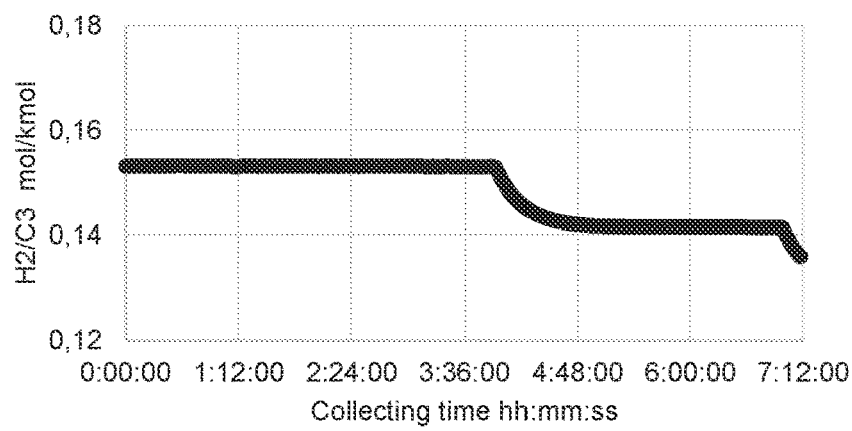
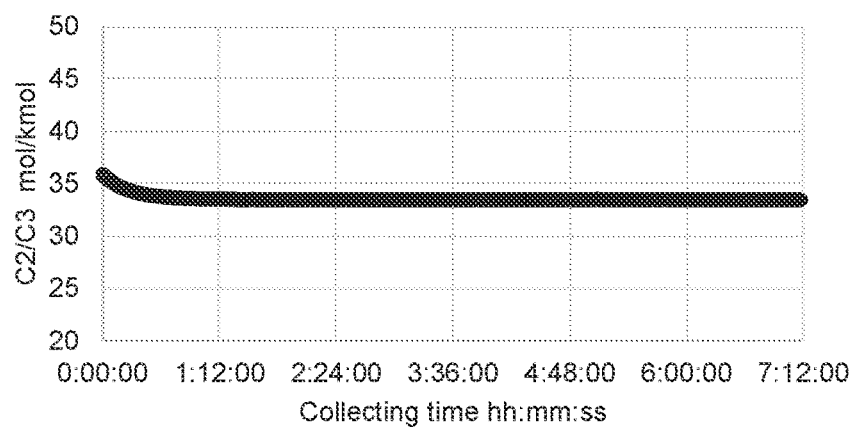
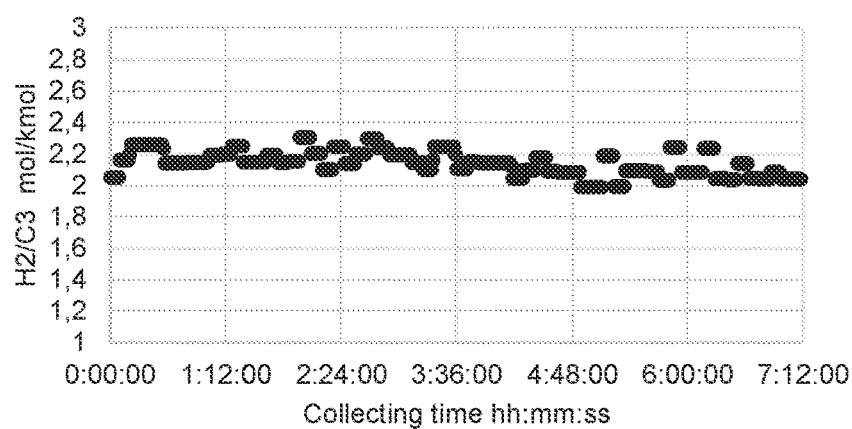

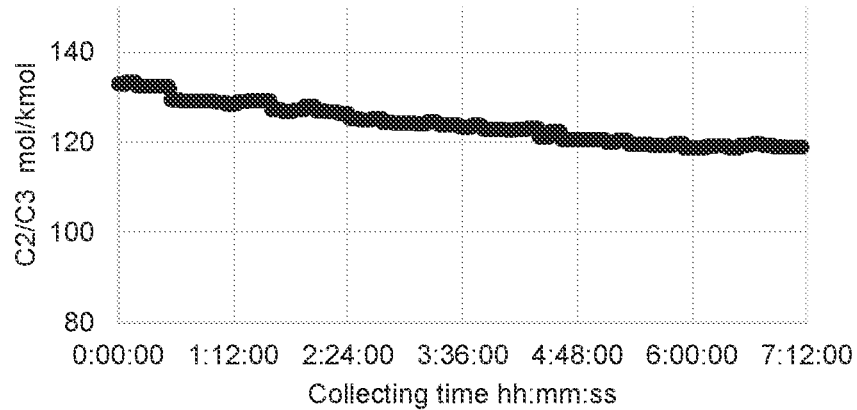
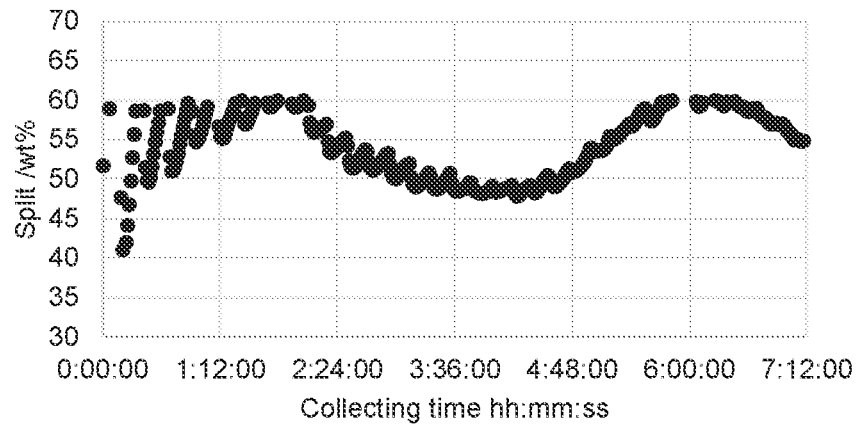

PROCESS FOR RECYCLING PROPYLENE-ETHYLENE COPOLYMERS

This application is a national stage of PCT/EP2021/076522, filed on Sep. 27, 2021, which claims priority to E.P. App. No. 20199432.4, filed on Sep. 30, 2020, the entirety of which is incorporated herein by reference.

The present invention provides a process for recycling propylene-ethylene copolymers to obtain polymers having good optical and mechanical properties, as well as good processability.

The present invention further relates to propylene-ethylene copolymers obtained by said process and articles made thereof.

BACKGROUND INFORMATION

Polypropylene based copolymers like propylene-ethylene copolymers are widely used in moulding applications, like thin wall packaging applications, which require a combination of good mechanical properties—e.g. high stiffness and impact strength—and optical properties.

Meeting the demands can be challenging, since many polymer properties are directly or indirectly interrelated. Often, improving a specific property can only be accomplished at the expense of another property. Stiffness can, for instance, be improved by increasing the crystallinity and/or the relative amount of homopolymer within the composition. However, as a consequence of such modifications, the material becomes more brittle, thereby resulting in poor impact properties and/or worse optical properties.

Impact behaviour or optical properties can be improved by increasing the comonomer content. Consequently, the material will become softer and loose on stiffness. Thus, impact or optical properties such as haze behave in a conflicting manner to stiffness.

Moreover, processability is linked with the viscosity or flowability of a polymer: especially for thin walled articles, complex tool design or fast production cycle a good flowability in the sense of a high MFR is essential. At the same time it is well known, that polymers with high MFRs tend to become more brittle in the sense of low impact strength, especially at low temperatures.

If polymerization is carried out in the presence of a single site catalyst, additional effects must be taken into consideration.

Specifically, single-site catalysts, which are increasingly used for copolymerization of propylene with other comonomers, lead to a highly random insertion of the comonomer units along the chain. A highly random comonomer insertion improves the optical behaviour. The inherently narrow molecular weight distribution (MWD) resulting from polymerization with said single-site catalysts furthermore reduces the amount of extractable fractions as compared to polymers produced in the presence of conventional Ziegler-Natta catalysts.

The highly random comonomer insertion of single-site based polypropylenes however can cause disadvantages for mechanical properties of the final polymer: based on the highly random comonomer distribution, these polypropylene grades tend to have lower stiffness than Ziegler-Natta grades at a similar comonomer content, nevertheless providing lower impact behaviour. Said stiffness reduction is aggravated by the aforementioned narrow MWD. Furthermore, the main drawback of polypropylene random copolymers produced via single-site catalysis is their worse nucleation response. This is expressed in lower crystallization temperatures as compared to polymers produced via Ziegler-Natty catalysis and having similar polymer characteristics as e.g. comonomer content and type, amount of soluble fractions, etc.

The majority of propylene (co)polymer production is conducted via large-scale continuous processes. Such processes allow for efficient production. However, when switching from the production of one well-specified polymer product to another, loosely specified materials are created. Typically, these loosely specified materials are produced during a transition phase, that is a period of time where comonomer content, Mw and MFR of the polymer are gradually changing due to dynamic process conditions. Hence, the obtained loosely specified materials are usually off-spec commodity grades or industrial waste.

DESCRIPTION OF THE PRIOR ART

WO 2019/197384 aims at providing a bimodal polypropylene random copolymer produced in the presence of a single site catalyst and exhibiting an improved balance of properties, i.e. nucleation response, crystallization temperature, mechanical and optical properties.

EP 3 617 238 A1 aims at providing unimodal propylene random copolymers having a specific comonomer insertion, in particular a specific comonomer distribution (CD) among the chains. These polypropylene materials exhibit a beneficial balance of stiffness, impact resistance, transparency, haze and flowability.

OBJECT OF THE INVENTION

It is an object of the current invention to recycle loosely specified propylene copolymer materials in order to reduce waste and, thus, avoid environmental pollution. Moreover, recycling of such materials would be advantageous from an economic perspective.

Accordingly, it is an object of the present invention to provide a process for recycling propylene copolymer materials wherein loosely specified propylene materials are modified, such that polypropylene copolymers having a good balance of properties and being suitable for packaging and/or injection moulding applications are obtained.

More specifically, it is an object of the present invention to provide a propylene random copolymer having low XCS content and good optomechanical ability (OMA).

Within this application the optomechanical ability (OMA) is understood as the product of Flexural Modulus and Charpy notched impact strength (NIS), divided by value for Haze on 2 mm thick injection moulded plaques ($Haze_2$), namely:

$$OMA = (\text{Flexural modulus [MPa]} * NIS\ [kJ/m^2])/Haze_2\ [\%].$$

SUMMARY OF THE INVENTION

It has surprisingly been found that the above objects can be achieved by a process described below. Thus, the present invention relates to a process for recycling propylene-ethylene copolymers comprising the steps of:
  a) polymerizing propylene and ethylene in the presence of a single site catalyst in a continuous polymerization reactor under dynamic conditions,
  b) collecting the resulting propylene-ethylene copolymer powders from step a) to obtain a mixture (M) of propylene-ethylene copolymer powders having a MFR$_2$ (ISO 1133, 230° C., 2.16 kg) in a range of from 1.5 to 80.0 g/10 min and an ethylene content in a range of from 1.0 to 4.0 wt. % based on the total weight of the mixture (M), c) compounding said mixture (M) in an extruder in the presence of a radical initiator, and a clarifying agent in an amount of from 0.01 to 1.0 wt. %, based on the total weight of the mixture of propylene-ethylene copolymer powders, and d) extruding the above mixture into pellets;

wherein, in step a), the dynamic conditions are such that the ethylene content and the melt flow rate (MFR$_2$) of the resulting copolymer gradually changes from a first predetermined ethylene content, E1 to a second predetermined ethylene content. E2, and from a first predetermined melt flow rate, MFR$_{2-1}$, to a second predetermined melt flow rate, MFR$_{2-2}$;

wherein collecting the copolymer powders in step b) is started when the polymer produced in step a) has a first ethylene content, E1, and a melt flow rate MFR$_{2-1}$, and collecting the copolymer powders in step b) is stopped when the polymer produced in step a) has a second ethylene content, E2, and a melt flow rate MFR$_{2-2}$; and wherein said pellets obtained in step d) have:

i) a MFR$_2$ (ISO 1133, 230° C., 2.16 kg) in the range of from 20 to 120 g/10 min, ii) a ratio of MFR$_{2\ pellets}$/MFR$_{2\ powder}$>1 iii) an ethylene content in a range of from 1.0 to 4.0 wt %, iv) a crystallization temperature Tc, determined by DSC according to ISO 11357-3:1999 in the range of from 100 to 125° C., and v) a flexural modulus, determined in a 3-point-bending according to ISO 178 on injection molded specimens of 80×10×4 mm, prepared in accordance with EN ISO 1873-2, of 850 MPa or more.

Moreover, the invention relates to propylene-ethylene copolymer pellets obtainable by the above process and exhibiting the desired properties.

In a further aspect, the invention relates to an article, preferably a cup, comprising, preferably consisting of, propylene-ethylene copolymer pellets as described above.

Finally, the invention also relates to the use of propylene-ethylene copolymer pellets—as described above—for injection moulding applications.

BRIEF DESCRIPTION OF THE FIGURES

FIG. 1 shows the time course of individual process parameters during step b) of the inventive process using IB1 as an example.

FIG. 2 shows the time course of individual process parameters during step b) of the inventive process using IB2 as an example.

DETAILED DESCRIPTION

The present invention relates to a process for recycling propylene-ethylene copolymers comprising the steps of:

a) polymerizing propylene and ethylene in the presence of a single site catalyst in a continuous polymerization reactor under dynamic conditions, b) collecting the resulting propylene-ethylene copolymer powders from step a) to obtain a mixture (M) of propylene-ethylene copolymer powders having a MFR$_2$ (ISO 1133, 230° C., 2.16 kg) in a range of from 1.5 to 80.0 g/10 min and an ethylene content in a range of from 1.0 to 4.0 wt. % based on the total weight of the mixture (M), c) compounding said mixture (M) in an extruder in the presence of a radical initiator, and a clarifying agent in an amount of from 0.01 to 1.0 wt. %, based on the total weight of the mixture of propylene-ethylene copolymer powders, and d) extruding the above mixture (M) into pellets.

Step a)

A change from production of one grade of polymer to another typically requires a transition period for a polymerization reactor to switch over to a new resin specification set and corresponding process conditions such as reaction temperature, reactants and reactant concentration ratios. During a transition from an initial polymerization reaction intended to produce an initial resin product meeting a first specification set to a target polymerization reaction intended to produce a target resin product meeting a second specification set, "off grade" polymer may be produced whose isotacticity or xylene solubles content (or other properties such as melt flow rate and/or comonomer content) do not meet either the first or the second specification set. The transition from the above-described first specification set to the second specification set is termed herein "dynamic conditions".

According to the present invention, the expression "dynamic conditions" relates to polymerization conditions, wherein characteristics of the copolymer, such as for example the comonomer content, preferably ethylene content, and/or the melt flow rate (MFR$_2$) of the resulting copolymer, gradually change from a first predetermined ethylene content, E1, to a second predetermined ethylene content, E2, and/or from a first predetermined melt flow rate, MFR$_{2-1}$, to a second predetermined melt flow rate, MFR$_{2-2}$.

MFR$_{2-1}$ and MFR$_{2-2}$ are, independently, in a range of from 1.5 to 80.0 g/10 min (ISO 1133, 230° C., 2.16 kg), preferably in a range of from 1.6 to 60 g/10 min, more preferably of from 1.6 to 40 g/10 min and even more preferably of from 1.6 to 20 g/10 min.

E1 and E2 are, independently, in a range of from 1.0 to 4.0 wt. %, preferably of from 1.2 to 3.8 wt. %, more preferably of from 1.4 to 3.5 wt. % and even more preferably of from 1.4 to 3.3 wt. %, based on the total weight of the respective polymer.

Said gradual change of the characteristics may comprise an increase or a decrease of at least one of the polymer characteristics. Moreover, depending on the specific process conditions, it is possible that one (numerical value of a) characteristic of the polymer increases or decreases while another (numerical value of a) characteristic of the polymer decreases, increases or remains constant.

Moreover, said gradual change in polymer characteristics may be achieved by adapting one or more process parameters in the continuous polymerization reaction. Suitable, adaptable process parameters include ethylene feed rate, propylene feed rate, hydrogen feed rate, pressure, temperature, etc.

Preferably, said polymerization of propylene and ethylene in a continuous polymerization reactor under dynamic conditions is conducted in the presence of a single site catalyst, more preferably in the presence of a metallocene catalyst.

Specific examples of suitable single site and/or metallocene catalysts are disclosed in WO 2019/197384.

According to an embodiment of the present invention, the continuous polymerization reactor may comprise one or more of a slurry reactor, a gas phase reactor or a combination thereof. Preferred slurry reactors are loop reactors. Moreover, it is preferable to conduct the polymerization in a sequential continuous polymerization reactor set up comprising an optional pre-polymerization reactor, one or more slurry reactors—preferably one or more loop reactors, and one or more gas phase reactors in a serial configuration.

Even more preferably, the polymerization is conducted as a multistage process, which is a loop-gas phase-process, such as developed by Borealis A/S, Denmark (known as BORSTAR® technology) described e.g. in patent literature, such as in EP-A-0887379 or in WO 92/12182.

Step b)

Step b) comprises collecting the resulting propylene-ethylene copolymer powders from step a) to obtain a mixture (M) of propylene-ethylene copolymer powders having a $MFR_2$ (ISO 1133, 230° C., 2.16 kg) in a range of from 1.5 to 80.0 g/10 min, preferably of from 1.6 to 60 g/10 min, more preferably of from 1.6 to 40 g/10 min and even more preferably of from 1.6 to 20 g/10 min, and an ethylene content in a range of from 1.0 to 4.0 wt. %, preferably of from 1.2 to 3.8 wt %, more preferably of from 1.4 to 3.5 wt. % and even more preferably of from 1.4 to 3.3 wt. % based on the total weight of the mixture (M).

According to an embodiment of the invention, collecting the copolymer powders in step b) is started when the polymer produced in step a) has a first ethylene content, E1, and a melt flow rate $MFR_{2-1}$, and collecting the copolymer powders in step b) is stopped when the polymer produced in step a) has a second ethylene content, E2, and a melt flow rate $MFR_{2-2}$.

In other words, collecting the copolymer powders is started either prior to adapting at least one process parameter or at the moment when said at least one process parameter is adapted.

In order to determine the endpoint of the collection step, i.e. the moment in time when collection of the polymer powders is stopped, it may be useful to monitor the polymer characteristics. In some embodiments, collecting the polymer powder is stopped when the process parameters in a continuous polymerization process are held constant again and/or when the reaction has reached a steady state.

Step c)

Step c) comprises compounding said mixture (M) in an extruder in the presence of a radical initiator, and a clarifying agent in an amount of from 0.01 to 1.0 wt. %, based on the total weight of the mixture of propylene-ethylene copolymer powders.

Preferably, the proplene-ethylene copolymer powder collected in step b) (compound (M)) is compounded in an extruder in the presence of a radical initiator at normal process temperature, that is at a temperature ranging from 190° C. to 280° C. The initiator initiates the degradation of propylene-ethylene copolymer; sometimes this process is also referred to as "visbreaking". Visbreaking of propylene-ethylene copolymers involves several steps. The most relevant steps are decomposition of the initiator at the elevated temperature, thus forming the radical. Said radical can abstract a hydrogen atom from the polymer chain (H-abstraction). Importantly, such obtained tertiary radicals of polypropylene are unstable and undergo a β-scission reaction, which cuts the chain and reduces the molecular weight (or viscosity) of the polypropylene. As a consequence of β-scission reaction, unsaturation (carbon-carbon double bond) forms as end groups of the new polymer molecules. This type of structure can be detected by different methods, e.g. $^1H$ NMR. Chemical shifts at 4.72 and 4.78 ppm, observed in 1H NMR, can be attributed to vinylidene terminated polypropylene and/or propylene-ethylene copolymer chains which result from the β-scission of tertiary polyproplyene and/or propylene-ehtylene copolymer macroradicals. During the visbreaking process, side reactions are possible. One of the major side reactions of tertiary polyproplyene and/or propylene-ehtylene copolymer macroradicals is disproportionate termination of the macroradicals, leading to the formation of internal vinylidene bonds. This can be detected via $^1H$ NMR by a chemical shift at 4.85 ppm. The overall content of both types of vinylidene bonds represents the content of polyproplyene and/or propylene-ehtylene copolymer macroradicals, whereas the content of terminal C═C bonds represents the degree of β-scission reaction in the system (Haiping Xing et al., Polymer 55 (2014) 5435-5444).

Suitable radical initiators are known in the art may be selected from an organic peroxides, organic peresters, organic hydroperoxides and/or hydroxylamine esters.

Said radical initiator, preferably peroxide; is added in an amount of from 0.1 to 5.0 wt. %; preferably from 1.0 to 4.0 wt. %, more preferably from 2.0 to 3.5 wt. %, based on the total weight of the mixture of propylene-ethylene copolymer powders (M).

Preferred radical initiators are the synergistic visbreaking compositions according to WO2016/096687A1 containing a peroxide (i) and a hydroxylamine ester (ii).

Peroxide (I)

Typical organic peroxides are selected from 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (©CUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxyisopropyl)benzene (DIFF) (for instance sold under the tradenames Perkadox 14S and Luperox DC).

Preferred peroxides are 5-dimethyl-2,5-bis(tert.butyl-peroxy)hexane (DHBP) and tert.butylcumyl-peroxide (BCUP)

It is within the scope of the present invention to use either one specific peroxide or mixtures of different peroxides.

The peroxide may be part of a masterbatch.

In the sense of the present invention "masterbatch" means a concentrated premix of a propylene polymer with a free radical forming agent (peroxide).

The peroxide compound may preferably be contained in the peroxide masterbatch composition in a range of from 1 to 50 wt %, like from 5 to 40 wt %, based on the total composition of the masterbatch.

Hydroxylamine Ester (ii)

Suitable hydroxylamine esters are selected from the group of hydroxylamine esters known in the state of the art, like for example those disclosed in WO 01/90113. One commercially available suitable hydroxylamine ester is for example Irgatec® CR76, sold commercially by BASF.

Synergistic Visbreaking Agent Composition

Synergistic visbreaking agent compositions as described in WO2016/096687A1 may preferably be used. The preferred synergistic visbreaking agent contains peroxide (i) and a hydroxylamine ester (ii) in a range of from 1 wt % (i):99 wt % (ii) to 99 wt % (i):1 wt % (ii), preferably in the range of 20 wt % (i):80 wt % (ii) to 95 wt % (i):5 wt % (ii), more preferably in the range of to 90 wt % (i):10 wt % (ii), even more preferably in the range of 30 wt % (i):70 wt % (ii)

to 85 wt % (i):15 wt % (ii) and most preferably in the range of 50 wt % (i):50 wt % (ii) to 85 wt % (i):15 wt % (ii).

The weight percentages are related to the pure compounds (i) and (ii).

The peroxide and the hydroxylamine ester can be used directly as mixture or the two components of the composition can be added separately to the polypropylene and/or propylene-ethylene copolymer.

Preferably the peroxide and the hydroxylamine ester are added to the polymer directly as a mixture.

Preferably the hydroxylamine ester is added in the form of a masterbatch and the peroxide in pure form.

More preferably the peroxide as well as the hydroxylamine ester is added in the form of a masterbatch.

Suitable clarifying agents are known in the art. Exemplary clarifying agents suitable for the current invention are disclosed in EP 1 989 252 B1. Preferably, said clarifying agent is soluble in the polymer melt of said propylene-ethylene copolymer powders (M).

More preferably, said clarifying agent comprises a substituted or unsubstituted dibenzylidene sorbitol compound and/or a substituted or unsubstituted nornitol compound.

The amount of said clarifying agent is in a range of from 0.05 to 1.0 wt. %, preferably from 0.1 to 0.8 wt. %, more preferably from 0.15 to 0.4 wt. %, based on the total weight of the mixture of propylene-ethylene copolymer powders.

Clarifying agents as used herein may act as nucleating agents and, thus, alter the crystallinity of the polymer.

Optionally, the compounding step c) may be conducted in the presence of further additives. Suitable further additives may be selected from antioxidants, antistatic agents and optical brighteners.

Said optional antioxidants and/or antistatic agents may be present in a total amount of from 0.05 to 1.0 wt. % based on the total weight of the mixture of copolymer powders.

Said optional optical brightener(s) may be present in an amount of from 10 to 1000 ppm based on the total weight of the mixture of copolymer powders.

Suitable optical brightener(s) are known in the art. For example, EP1989252B1 discloses a selection of optical brighteners suitable for the present invention.

Preferably, an optical brightener is present and comprises a water insoluble pigment.

Step d)

Step d) comprises extruding the above mixture (M) into pellets, wherein said pellets have:
i) a $MFR_2$ (ISO 1133, 230° C., 2.16 kg) in the range of from 20 to 120 g/10 min, preferably from 40 to 115 g/10 min, more preferably from 50 to 110 g/10 min, even more preferably from 60 to 100 g/10 min;
ii) a ratio of $MFR_{2\ pellets}/MFR_{2\ powder}>1$;
iii) an ethylene content in a range of from 1.0 to 4.0 wt %, preferably from 1.2 to 3.8 wt. %, more preferably from 1.4 to 3.5 wt. %, even more preferably from 1.4 to 3.3 wt. %;
iv) a crystallization temperature Tc, determined by DSC according to ISO 11357-3:1999 in the range of from 100 to 125° C., and
v) a flexural modulus, determined in a 3-point-bending according to ISO 178 on injection molded specimens of 80×10×4 mm, prepared in accordance with EN ISO 1873-2, of 850 MPa or more.

According to a preferred embodiment of the invention, said pellets further have at least one of:
a melting temperature Tm, determined by DSC according to ISO 11357-3:1999, in the range of from 125 to 150° C.; and/or
a gamma phase content of at least 70%, preferably of from 70 to 99%.

The expression "gamma phase content" as used herein relates to the orthorhombic gamma crystal phase 100*Kγ as determined by wide-angle X-ray scattering (WARS) on injection moulded plaque samples of 60×60×1 mm³.

According to another aspect, the invention further relates to propylene-ethylene copolymer pellets obtainable by the above specified process.

Preferably, said propylene-ethylene copolymer pellets have the following properties:
i) a $MFR_2$ (ISO 1133, 230° C., 2.16 kg) in a range of from 20 to 120 g/10 min, preferably from 40 to 115 g/10 min, more preferably from 50 to 110 g/10 min, even more preferably from 60 to 100 g/10 min,
ii) a ratio of $MFR_{2\ pellets}/MFR_{2\ powder}>1$
iii) an ethylene content in a range of from 1.0 to 4.0 wt %, preferably from 1.2 to 3.8 wt. %, more preferably from 1.4 to 3.5 wt. %, even more preferably from 1.4 to 3.3 wt. %;
iv) a crystallization temperature Tc, determined by DSC according to ISO 11357-3:1999 in the range of from 100 to 125° C., and
v) a flexural modulus, determined in a 3-point-bending according to ISO 178 on injection molded specimens of 80×10×4 mm, prepared in accordance with EN ISO 1873-2, of 850 MPa or more.

More preferably, said propylene-ethylene copolymer pellets further have at least one of a melting temperature, $T_m$, determined by DSC according to ISO 11357-3:1999, in a range of from 130 to 150° C. and a gamma phase content, determined by wide-angle X-ray sccattering (WAXS), in a range of from 70 to 99%.

By using the propylene-ethylene copolymer pellets—as described above—for injection moulding applications, articles, preferably cups, comprising or consisting of said propylene-ethylene copolymer pellets can be obtained.

Experimental Part

A) Measuring Methods

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR of polypropylene is determined at a temperature of 230° C. and a load of 2.16 kg.

Xylene Cold Soluble (XCS)

Xylene Cold Soluble fraction at room temperature (XCS, wt.-%) is determined at 25° C. according to ISO 16152; 5" edition; 2005 Jul. 1.

Flexural Modulus

The flexural modulus was determined in a 3-point-bending test at 23° C. according to ISO178 on 80×10×4 mm³ test bars injection moulded in line with EN ISO 1873-2.

Charpy Notched Impact Strength (NIS)

The Charpy notched impact strength (NIS) was measured according to ISO 179 1 eA at +23° C., using injection moulded bar test specimens of 80×10×4 mm³ prepared in accordance with EN ISO 1873-2.

Haze

Haze determined according to ASTM D1003-00 on 60×60×2 mm³ plaques injection moulded in line with EN ISO 1873-2. The injection moulded plaques were produced at a melt temperature of 230° C. Unless otherwise indicated, haze values provided herein are measured on 2 mm thick plaques.

Optomechanical Ability (OMA).

The optomechanical ability (OMA) is the product of Flexural Modulus and Charpy notched impact strength, divided by value for Haze on 2 mm thick injection moulded plaques (Haze$_2$):

OMA=(Flexural modulus [MPa]*NIS [kJ/m$^2$])/Haze$_2$ [%].

Comonomer Determination by NMR Spectroscopy

Quantitative nuclear-magnetic resonance (NMR) spectroscopy was further used to quantify the comonomer content and comonomer sequence distribution of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., et al., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., et al., J. Mag. Reson. 187 (2007) 225; Busico, V., et al., Macromol. Rapid Commun, 2007, 28, 1128). A total of 6144 (6k) transients were acquired per spectra.

Quantitative $^{13}$C{$^1$H} NMR spectra were processed, integrated and relevant quantitative properties determined from the integrals using proprietary computer programs. AH chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950).

With characteristic signals corresponding to 2.1 erythro regio defects observed (as described in L. Resconi, L. et al., Chem. Rev. 2000, 100 (4), 1253, in Cheng, H. N., Macromolecules 1984, 17, 1950, and in W-J. \Nang and S. Zhu, Macromolecules 2000, 33 1157) the correction for the influence of the region-defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the 13C{1H} spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et, al, was modified to reduce the influence of non-zero integrals of sites that are known to not be present. This approach reduced the overestimation of ethylene content for such systems and was achieved by reduction of the number of sites used to determine the absolute ethylene content to:

$E=0.5(S\beta\beta+S\beta\gamma+S\delta+0.5(S\delta\beta+S\alpha\gamma))$

Through the use of this set of sites the corresponding integral equation becomes:

$E=0.5(I_H+I_G+0.5(I_C+I_D))$ using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$E$ [mol %]=100*$fE$

The weight percent comonomer incorporation was calculated from the mole fraction:

$E$[wt %]=100*($fE$*28.06)/(($fE$*28.06)+((1−$fE$)*42.08))

Differential Scanning Calorimetry (DSC)

Differential scanning calorimetry (DSC) analysis, melting temperature ($T_m$) and melt enthalpy ($H_m$), crystallization temperature ($T_C$), and heat of crystallization ($H_C$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature ($T_c$) and heat of crystallization ($H_c$) are determined from the cooling step, while melting temperature ($T_m$) and melt enthalpy ($H_m$) are determined from the second heating step.

Throughout the patent the term $T_C$ or ($T_{CR}$) is understood as Peak temperature of crystallization as determined by DSC at a cooling rate of 10 K/min (i.e. 0.16 K/sec).

Cup Test

Preparation of 840 ml Cups

From the polymers as defined below cups are produced by injection molding using an Engel speed 180 machine with a 35 mm barrier screw (supplied by Engel Austria GmbH). The melt temperature was adjusted to 245° C. and the mould temperature to 10° C.; an injection speed of 770 cm$^3$/s with an injection time of 0.08 s was used, followed by a holding pressure time of 0.1 s with 1300 bar (decreasing to 800 bar) and a cooling time of 1.5 s, giving a standard cycle time of 3.8 s. The dimensions of the cup are as follows: Height 100 mm, diameter top 115 mm, diameter bottom 95 mm, bottom wall thickness 0.44 mm, side-wall thickness 0.40 mm. The top load test was performed by compression between two plates attached to a universal testing machine with a test speed of 10 mm/min according to an internal procedure in general agreement with ASTM D642. For testing, the cup is placed upside down (i.e. with the bottom facing the moving plate) into the test setup and compressed to the point of collapse which is noticed by a force drop on the force-deformation curve, for which the maximum force is noted. At least 8 cups are tested to determine an average result.

The drop test is performed on the injection moulded cups. The cups are filled up with water and clued with a lid. During a pre-test the estimated falling height is determined on 10 cups. The final test is to be performed on 20 cups, starting at the pre-determined falling height. For each run 2 cups are dropped. Depending on 2 breaks or 1 break/1 no-break (=neutral) or 2 no-breaks, the next dropping height is chosen to be lower/equal/higher for the next test round. A "break" in the sense of the present test is given as soon as a cup exhibits at least one (visible) crack. In case of 2 breaks, the next dropping height is chosen to be lower; in case of a neutral result, the test is repeated at the same dropping height; in case of a positive result (2 no-breaks), the next dropping height is chosen to be higher. The increase or decrease in height is 0.25 m, only at dropping heights <1.5 m the increase or decrease is 0.1 m. The final drop height is determined depending on the falling heights of the containers after the first change in trend or after the first "neutral" result according to the following formula:

$$h_e = \Sigma(n_i h_i)/n_g$$

wherein $h_e$=drop height
$h_i$=drop height
$n_i$=number of containers dropped at the respective height, and
$n_g$=total number of dropped containers.

Wide-Angle X-Ray Scattering (WAXS)

The samples used for WAXS measurement were prepared by applying 5 to 7 mg of samples to a DSC pan, heating it to 225° C., waiting for 5 min to erase the thermal history, then cooling down to 23° C. with 10° C./min.

The determination of crystallinity and of polymorphic composition was performed in reflection geometry using a Balker D8 Discover with GADDS x-ray diffractometer operating with the following settings: x-ray generator: 30 kV and 20 mA; $\Theta_1$=6° & $\Theta_3$=13°; sample-detector distance: 20 cm; beam size (collimator): 500 µm; and duration/scan: 300 seconds. 3 measurements have been performed on each sample. Intensity vs. 2$\Theta$ curves between 2$\Theta$=10° and 2$\Theta$=32.5° were obtained by integrating the 2-dimensional spectra.

The quantification of intensity vs. 2$\Theta$ curves were then performed as follows:

Intensity vs. 2$\Theta$ curve was acquired with the same measurement settings on an amorphous iPP sample, which was prepared by solvent extraction. An amorphous halo was obtained by smoothing the intensity vs. 2$\Theta$ curve. The amorphous halo has been subtracted from each intensity vs. 2$\Theta$ curve obtained on actual samples and this results in the crystalline curve.

The crystallinity index $X_C$; is defined with the area under the crystalline curve and the original curve using the method proposed by Challa et al. (Makromol. Chem, vol. 56 (1962); pages 169-178) as:

$$X_C = [(\text{Area under crystalline curve})/(\text{Area under original spectrum})] \times 100.$$

In a two-phase crystalline system (containing α- and β-modifications), the amount of β-modification within the crystalline phase B was calculated using the method proposed by Turner-Jones et al. (Makromol. Chem. Vol. 75 (1964), pages 134-158) as:

$$B = [I^\beta(300)]/[I^\alpha(110) + I^\alpha(040) + I^\alpha(130) + I^\beta(300)],$$

where, $I^\beta(300)$ is the intensity of B(300) peak, $I^\alpha(110)$ is the intensity of α(110) peak, $I^\alpha(040)$ is the intensity of α(040) peak and $I^\alpha(130)$ is the intensity of α(130) peak obtained after subtracting the amorphous halo.

In a two-phase crystalline system (containing α- and γ-modifications), the amount of γ-modification within the crystalline phase G (i.e. Kγ) was calculated using the method developed by Pae (J. Polym. Sci., Part A2, vol. 6 (1968), pages 657-663) as:

$$G = [I^\gamma(117)]/[I^\alpha(130) + I^\gamma(117)],$$

where, $I^\alpha(130)$ is the intensity of α(130) peak and $I^\gamma(117)$ is the intensity of γ(117) peak obtained after subtracting base line joining of the base of these peaks.

B) Materials

Preparation of the Single Site Catalyst System

Catalyst Complex

The following metallocene complex has been used as described in WO 2019/179959:

Preparation of MAO-Silica Support

A steel reactor equipped with a mechanical stirrer and a filter net was flushed with nitrogen 10 and the reactor temperature was set to 20° C. Next silica grade DM-L-303 from AGO Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° C. under nitrogen flow for 2 hours and then for 5 hours under vacuum (−0.5 barg) with stirring. MAO treated support was collected as a free-flowing white powder found to contain 12.2% Al by weight.

Single Site Catalyst System Preparation 30 wt.-% MAO in toluene (0.7 kg) was added into a steel nitrogen blanked reactor via a burette at 20° C. Toluene (5.4 kg) was then added under stirring. The metallocene complex as described above (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, foiled by drying under N2 flow at 60° C. for 2 h and additionally for 5 h under vacuum (−0.5 barg) under stirring.

Preparation of Inventive Base Polymer

Both of the inventive base polymers were produced in the presence of a single site catalyst prepared as described above, and in a Borstar pilot plant, comprising a reactor sequence consisting of a prepolymerization reactor, a loop reactor and a (first) gas phase reactor (GPR1). During the production, the conditions in the prepolymerization reactor are held constant. The temperature is 20° C., the residence time is 20 min. The concentration of $H_2$ (expressed as H2/C3 for both loop and GPR1), $C_2$ (expressed as C2/C3) are varied during collection.

Conditions for the production of Inventive Base 1 (IB1) are given in FIG. 1*a* H2/C3 in loop, 1*b* C2/C3 in loop, 1*c* H2/C3 in GPR1, and 1*d* C2/C3 in GPR1, and 1*e* split in loop side. It is collected as a mixture (IB1) of propylene-ethylene copolymers with varying comonomer content, molecular weight and melt flow rate of the individual polymer due to the dynamic process conditions. This mixture, IB1, has a $MFR_2$ of 6.8 g/10 min and an ethylene content of 1.8 wt %. At the start point of collection, the C2 after GPR1 is 1.6 wt %, MFR 9.1 g/10 min, at the end of collection, the C2 after GPR1 is 3.2 wt %, MFR 1.4 g/10 min.

Conditions for the production of Inventive Base 2 (IB2) are given in FIG. 2a H2/C3 in loop, 2b C2/C3 in loop, 2c H2/C3 in GPR1, and 2d C2/C3 in GPR1, and 2e split in loop side. It is also collected as a mixture of propylene-ethylene copolymers with varying comonomer content, molecular weight and melt flow rate of the individual polymer due to dynamic process conditions. This mixture, IB2, has a MFR$_2$ 2.4 g/10 min and an ethylene content of 3.0 wt %. At the start point of collection, the C2 after GPR1 is 3.3 wt %, MFR 2.5 g/10 min, at the end of collection, the C2 after GPR1 is 2.6 wt %, MFR 2.4 g/10 min.

Comparative base polymer (CB) is produced in the presence of a non-phthalate based Ziegler-Natty catalyst. The process is described in Table 1. Details regarding the catalyst used are disclosed for example in the earlier application EP2999721.

TABLE 1

Polymerization process of CB base polymer

| | | Comparative base polymer (CB) |
|---|---|---|
| Pre-polymerization reactor | | |
| Temperature | ° C. | 30 |
| D-Donor | g/tC3 | 40 |
| TEAL/propylene | g/tC3 | 170 |
| Al/D-Donor [Co/ED] | mol/mol | 8 5 |
| Al/Ti [Co/TM] | mol/mol | 224 |
| Residence Time | h | 0 3 |
| Loop reactor | | |
| Temperature | ° C. | 70 |
| Pressure | kPa | 5400 |
| Residence time | h | 0.4 |
| Split | wt % | 44 |
| H2/C3 ratio | mol/kmol | 3.82 |
| C2/C3 ratio | mol/kmol | 6.27 |
| MFR2 | g/10 min | 20.6 |
| C2 content | wt % | 2.3 |
| First gas-phase reactor | | |
| Temperature | ° C. | 80 |
| Pressure | kPa | 2350 |
| Residence time | h | 1.5 |
| Split | wt % | 56 |
| H2/C3 ratio | mol/kmol | 54.9 |
| C2/C3 ratio | mol/kmol | 21.12 |
| MFR2 | g/10 min | 23 |
| C2 content | wt % | 3.4 |

The pelletization of PP powder and additives is done in a twin screw extruder, with screw diameter of 18 mm, melt temperature of 240° C., and a throughput of 7 kg/h. The following additives are used:

Irganox B 215—is an antioxidant commercially available from BASF;

Ceasit AV FI Veg—supplied by Baerlocher;

GRINDSTED® PS 426—produced by Danisco (DuPont Group);

DHBP-5-IC5—supplied by United Initiators;

Milliad 3988 and Milliad NX8000ECO—supplied by Milliken Chemical;

Bright 100—produced by MPI-CHEMIE B.V.

All of the chemicals are used directly.

TABLE 2

Pelletization additives and product properties

| | | IE1 | IE2 | IE3 | CE1 |
|---|---|---|---|---|---|
| IB1 | wt % | 97.17 | 97.32 | | |
| IB2 | wt % | | | 96.37 | |
| CB | wt % | | | | 99.12 |
| Irganox B 215 | wt % | 0.1 | 0.1 | 0.1 | 0.1 |
| Ceasit AV FI Veg | wt % | 0.09 | 0.09 | 0.09 | 0.09 |
| GRINDSTED ® PS 426 | wt % | 0.14 | 0.14 | 0.14 | 0.14 |
| Milliad 3988 | wt % | 0.2 | | | |
| Milliad NX8000ECO | wt % | | 0.2 | 0.2 | 0.2 |
| Bright 100 | wt % | 0.2 | | | |
| DHBP-5-IC5 | wt % | 2.1 | 2.15 | 3.1 | 0.35 |
| MFR$_{pellets}$ | g/10 min | 76 | 80 | 82 | 80 |
| MFR$_{pellets}$/MFR$_{powder}$ | | 11 | 12 | 34 | 3 |
| Tc | ° C. | 116 | 117 | 109 | 120 |
| Tm1 | ° C. | 145 | 145 | 138 | 150 |
| Tm2 | ° C. | 134 | 134 | 126 | 138 |
| Hm1 | J/g | 18 | 17 | 2 | 29 |
| Hm2 | J/g | 74 | 72 | 77 | 59 |
| Hm2/(HM1 + Hm2) | % | 80.4 | 80. | 97.5 | 67.0 |
| 100*ky | % | 79 | 81 | 91 | 64 |
| XCS | wt % | 1.49 | 1.52 | 2.88 | 7.89 |
| Standard test | | | | | |
| NIS | KJ/m2 | 3..46 | 3.43 | 5.23 | 4.4 |
| FM | MPa | 1203 | 1187 | 895 | 1090 |
| Haze/2 mm | % | 18.98 | 22.88 | 15.7 | 33.58 |
| OMA | | 219 | 178 | 298 | 143 |
| cup tests | | | | | |
| Cycle time | S | 3.4 | 3.2 | 3.9 | 3.3 |
| Drop height | m | 0.44 | 0.38 | 0.7 | 0.38 |
| Max. Force | N | 182.7 | 177.2 | 139.0 | 164.7 |

As can be seen, the inventive examples show better optical properties, expressed by lower haze values and improved OMA. Moreover, the inventive examples exhibit good mechanical properties as reflected by higher OMA and improved results in the cup tests.

Specifically, in the cup application tests, the processing of cup formation was good, the cycle time is similar to that of the Comparative Example (CE1). IE1 and IE2 had an improved combination of high stiffness (top load)/high impact (drop height) over CE1. IE3 had lower maximum force, but the drop height was the highest among all examples.

The invention claimed is:

1. A process for recycling propylene-ethylene copolymers comprising the steps of:
   a) polymerizing propylene and ethylene in the presence of a single site catalyst in a continuous polymerization reactor under dynamic conditions,
   b) collecting a propylene-ethylene copolymer obtained in step a) comprising at least two fractions of propylene-ethylene copolymer powders (P1, P2) to obtain a propylene-ethylene copolymer mixture (M) having a MFR2 (ISO 1133, 230° C., 2.16 kg) in a range of from 1.5 to 80.0 g/10 min and an ethylene content in a range of from 1.0 to 4.0 wt. % based on the total weight of the mixture (M),
   c) compounding said mixture (M) in an extruder in the presence of a radical initiator, and a clarifying agent in an amount of from 0.01 to 1.0 wt. %, based on the total weight of the mixture of propylene-ethylene copolymer powders, and
   d) extruding the above mixture into pellets;
   wherein, in step a), the dynamic conditions are such that the ethylene content and the melt flow rate (MFR2) of the resulting copolymer gradually changes from a first predetermined ethylene content, E1, to a second predetermined ethylene content, E2, and/or from a first predetermined melt flow rate, MFR2-1, to a second predetermined melt flow rate, MFR2-2;

wherein collecting the copolymer powders in step b) is started when the polymer produced in step a) has a first ethylene content, E1, and a melt flow rate MFR2-1, and collecting the copolymer powders in step b) is stopped when the polymer produced in step a) has a second ethylene content E2 and a melt flow rate MFR2-2; and wherein the propylene-ethylene copolymer pellets obtained in step d) have:

i) a MFR2 (ISO 1133, 230° C., 2.16 kg) in the range of from 20 to 120 g/10 min, ii) a ratio of MFR2 pellets/MFR2 powder >1 iii) an ethylene content in a range of from 1.0 to 4.0 wt %, iv) a crystallization temperature Tc, determined by DSC according to ISO 11357-3:1999 in the range of from 100 to 125° C., and v) a flexural modulus, determined in a 3-point-bending according to ISO 178 on injection molded specimens of 80×10×4 mm, prepared in accordance with EN ISO 1873-2, of 850 MPa or more.

2. The process according to claim 1, wherein the radical initiator is an organic peroxide.

3. The process according to claim 1, wherein the clarifying agent is soluble in the polymer melt.

4. The process according to claim 1, wherein the clarifying agent comprises a substituted or unsubstituted dibenzylidene sorbitol compound.

5. The process according to claim 1, wherein the compounding step c) is conducted in the presence of further additives selected from antioxidants and antistatic agents in a total amount of from 0.05 to 1.0 wt. % and an optical brightener in an amount of from 10 to 1000 ppm, based on the total weight of the mixture of copolymer powders.

6. The process according to claim 5, wherein the optical brightener comprises a water insoluble pigment.

7. The process according to claim 1, wherein the extruded pellets have a melting temperature Tm, determined by DSC according to ISO 11357-3:1999, in the range of from 130 to 150° C. and/or have a gamma phase content of at least 70%, determined by wide-angle X-ray scattering as described herein.

* * * * *